United States Patent [19]

Peterman et al.

[11] 4,155,987

[45] May 22, 1979

[54] CLAUS TAIL GAS RECOVERY

[75] Inventors: Lee G. Peterman, Flossmoor; Edward Czyszczon, Calumet City, both of Ill.

[73] Assignee: Atlantic Richfield Company, Philadelphia, Pa.

[21] Appl. No.: 717,850

[22] Filed: Aug. 26, 1976

[51] Int. Cl.² .......................... C01B 17/00; B01J 8/00; C01B 17/02; C01B 17/16
[52] U.S. Cl. .................................. 423/242; 423/244; 423/573 G; 423/574 R; 423/564
[58] Field of Search .............................. 423/242–244, 423/573 G, 574 G, 564

[56] References Cited

U.S. PATENT DOCUMENTS

| 3,752,877 | 8/1973 | Beavon | 423/244 |
| 3,947,547 | 3/1976 | Groenendaal et al. | 423/244 |
| 3,985,861 | 10/1976 | Hudson | 423/244 |

OTHER PUBLICATIONS

Petroleum Products Handbook, Guthrie 1960, 8–37.

*Primary Examiner*—O. R. Vertiz
*Assistant Examiner*—G. A. Heller
*Attorney, Agent, or Firm*—John B. Goodman

[57] ABSTRACT

An improved Claus tail gas recovery process involving stoichiometric combustion of a hydrocarbon gas when the hydrocarbon gas composition is not constant.

11 Claims, 2 Drawing Figures

CLAUS TAIL GAS RECOVERY

BACKGROUND OF THE INVENTION

1. Field of the Invention

The field of this invention relates to an improved process of recovering the sulfur from Claus tail gases.

2. Prior Art

The recovery of elemental sulfur by the Claus reaction is well known and various processes using this reaction are in commercial use. The Claus reaction involves obtaining elemental sulfur from a gas that contains sulfur dioxide and hydrogen sulfide according to the reaction:

$$2 H_2S + SO_2 \rightarrow 2H_2O + 3 S$$

In the Claus process one strives to obtain as good as possible a stoichiometric ratio of hydrogen sulfide to sulfur dioxide of 2 moles hydrogen sulfide to 1 mole of sulfur dioxide in order to make the yield of sulfur according to the Claus reaction be as large as possible. Usually the reaction is carried out in steps, namely one thermal step, whereby a great portion of the sulfur is formed and is condensed out by cooling of the gas, followed by two or more catalytic steps at elevated temperature, with intermediate cooling of the gas for condensation of the sulfur formed.

The Claus reaction, however, never proceeds quite completely. Even if the ratio of the gases employed therein is substantially stoichiometric, the Claus tail gas still will contain some sulfur dioxide and/or hydrogen sulfide. It is also possible that some carbonyl sulfide and/or carbon disulfide can form in the course of the Claus reaction and appear in the tail gas. The result is that the effluent or tail gas stream from such a reaction can contain substantial quantities of sulfur compounds.

It has been recognized that emitting this tail gas to the atmosphere can present environmental problems because of the sulfur content.

A known method for recovering the sulfur content of such a tail gas stream involves enriching this effluent gas stream with a source of hydrogen to a level which is at least equal to the stoichiometric amount of hydrogen required to convert the contained sulfur dioxide and other sulfur compounds to hydrogen sulfide and catalytically hydrogenating essentially all of the contained sulfur compounds to hydrogen sulfide at a temperature from about 300° to about 800° F., and treating the hydrogenated gas stream to remove hydrogen sulfide.

A variation of this method involving specific effluent gas streams is disclosed in U.S. Pat. No. 3,752,877 to Beavon issued Aug. 14, 1973, incorporated herein by reference.

Such a process can be desirable because the hydrogen sulfide can be conveniently collected employing conventional procedures and recirculated to the Claus reactor.

In such a process, the tail gas and hydrogen must be heated to a temperature sufficient to effect the conversion of sulfur compounds to hydrogen sulfide.

A very advantageous method of supplying this heat entails combusting a hydrocarbon gas and mixing the hot combustion products directly into or with the tail gas and hydrogen, for example, via an in-line burner. Heretofore, however, this method of supplying heat has not provided good process results. Adverse results have included carbon formation on the catalyst, and formation of undesirable sulfur-containing reaction products, i.e., sulfur reaction products other than hydrogen sulfide.

A more desirable process would include in-line heating without the adverse results mentioned above.

SUMMARY OF THE INVENTION

It has now been found that even small variations in hydrocarbon gas composition resulting in non-stoichiometric combustion in an in-line heater can significantly effect a tail gas recovery process adversely.

In summary, this invention provides an improvement in the process of recovering the sulfur content of a Claus tail gas by providing for stoichiometric combustion of hydrocarbon gas when the hydrocarbon gas composition is not constant. More particularly, this improvement comprises providing substantially stoichiometric combustion by continuously changing the amount of oxygen-containing gas in response to changes in hydrocarbon gas composition to maintain substantially stoichiometric combustion.

DETAILED DESCRIPTION OF THE INVENTION AND ITS PREFERRED EMBODIMENTS

Figure 1:
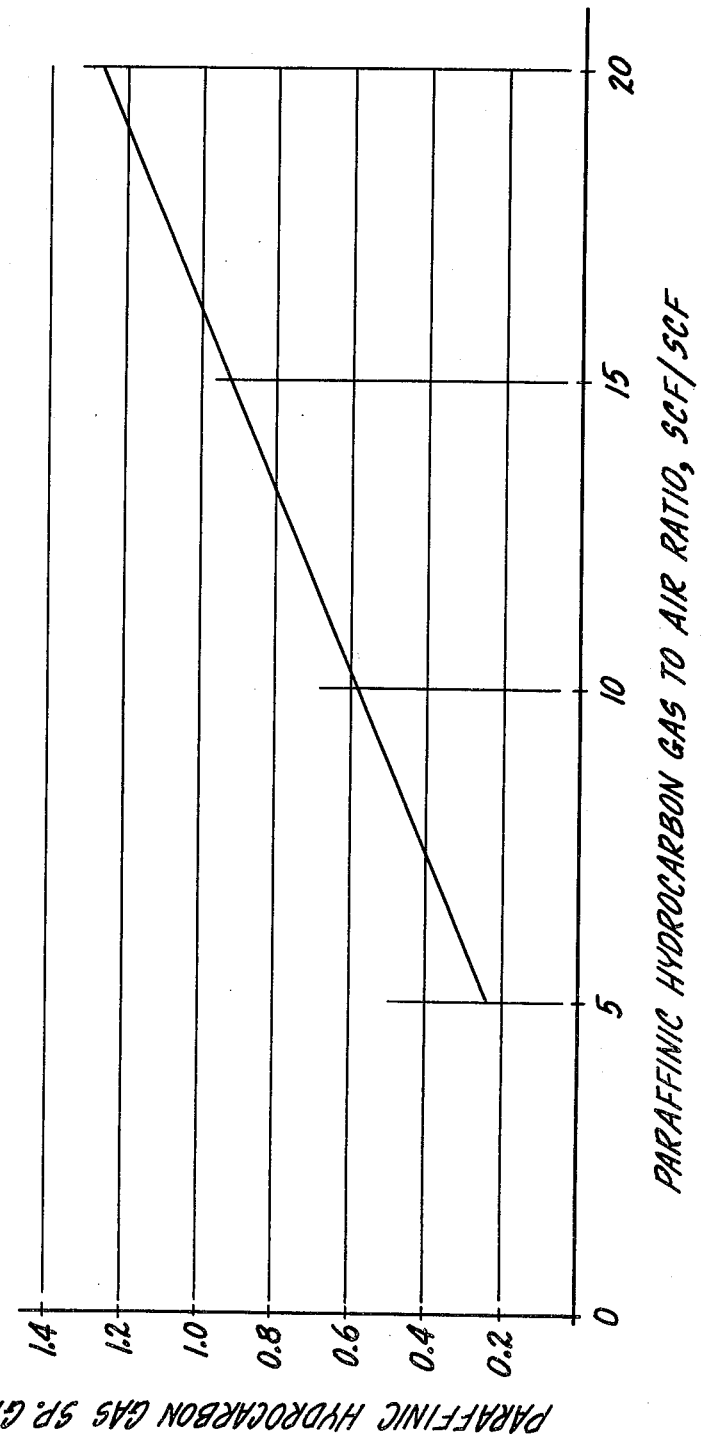
FIG. 1 is a graph showing the ratio in standard cubic feet of air to paraffinic hydrocarbon gas for stoichiometric combustion as a function of the hydrocarbon gas specific gravity.

It has now been found that in a process for reducing the sulfur content of a Claus tail gas stream involving (1) combining the tail gas stream with a hydrogen source in an amount at least equal to the stoichiometric amount required to convert the sulfur content to hydrogen sulfide, (2) raising the temperature of the combined stream to hydrogenation temperature by combusting an amount of hydrocarbon gas and oxygen-containing gas to provide hot gaseous combustion products and mixing the hot combustion products with the combined stream, (3) introducing the heated mixture to a catalytic reaction zone to convert substantially all of the sulfur content to hydrogen sulfide, and (4) treating the hydrogenated gas stream to remove hydrogen sulfide; that a substantial improvement is obtained by adjusting the amount of oxygen-containing gas in response to changes in hydrocarbon gas composition to maintain substantially stoichiometric combustion.

The effluent or tail gas from a typical Claus reactor can contain a variety of sulfur compounds which, if incinerated to sulfur dioxide would emit to the atmosphere from about 15,000 to 30,000 parts of sulfur dioxide per million parts of dry gas.

In the practice of this invention this tail gas stream is combined with sufficient hydrogen such that substantially all of the sulfur compounds are converted to hydrogen sulfide. Sulfur appears in a typical effluent tail gas in one or more of the following forms: COS, $CS_2$, $SO_2$, $H_2S$, $S_2$, $S_4$ and $S_6$. The relative amounts contained in an effluent gas stream can be readily determined by analytical procedures. From this analysis the hydrogen requirement for hydrogenating the sulfur compounds to hydrogen sulfide can be computed. Generally a hydrogen concentration of an amount required sufficient for the reaction $$SO_2 + 3H_2 \rightarrow H_2S + 2H_2O$$

will result in a significant diminution of $SO_2$ content for air pollution purposes. While this represents the minimum amount of hydrogen required for the reaction, it is preferred to provide the gas stream with hydrogen to a level of from about 1.25 to 2.0 times that of the stoichiometric amounts required for this reaction as this will serve to convert substantially all of the sulfur species present to hydrogen sulfide, with sulfur, for example, being converted by the reaction $$S_x + H_2 \rightarrow xH_2S$$

wherein x is the interger 2, 4, 6 or 8.

The hydrogen required for the reaction may be obtained from any convenient source, including the hydrogen which is present in the effluent gas stream as free hydrogen or available from a donor, such as carbon monoxide, which will react with water in the presence of a catalyst to yield hydrogen and carbon dioxide.

Molecular hydrogen is preferred, whether contained in the effluent gas stream or externally generated. For example, hydrogen may be economically and continuously produced for use in the process of this invention by concurrent reaction of a low cost hydrogen donor, such as methane or carbon monoxide, in a hydrogen generator, such as a steam reformer, where the donor undergoes hydrogen-producing reactions such as:

$$CH_4 + H_2O \rightarrow CO + 3H_2 \quad (1)$$

$$CO + H_2O \rightarrow CO_2 + H_2 \quad (2)$$

at temperatures generally from about 1400° F. to about 1600° F. for reaction (1) and generally from about 400° F. to about 800° F. for reaction (2) above. The crude hydrogen output stream from the hydrogen generator can then be combined with the tail gas stream and, where desired, may be used to supply part of the heat to raise the enriched effluent gas stream to hydrogenation temperatures.

The hydrogen enriched tail gas stream is then raised to hydrogenation temperatures, for example, from about 300° F. to 800° F.

In accordance with this invention, this temperature is achieved by in-line heating, i.e., combusting an amount of hydrocarbon gas and oxygen-containing gas, and mixing the hot gaseous combustion products with the hydrogen enriched tail gas stream.

Examples of typical hydrocarbon gases suitable for use in this invention are paraffinic gases such as methane, ethane, propane, butane and pentane; and olefinic gases such as ethylene, propylene, butenes and pentenes. Often hydrocarbon gases are available only as non-constant mixtures of two or more of such gases.

The most suitable oxygen-containing gas is air and it can be applied in suitable amounts by a commercial blower.

A preferred known practice heretofore was to maintain a substantially constant selected hydrogenation temperature by sensing the temperature in the hydrogenation reactor and adjusting the amount of hydrocarbon gas (supplied, for example, to an in-line heater) to the selected temperature. In turn, the amount of oxygen-containing gas was adjusted in response to changes in amounts of hydrocarbon gas according to a pre-selected ratio. Only so long as the hydrocarbon gas composition remains constant, however, could the resulting combustion be stoichiometric.

In the process of this invention, the amount of oxygen-containing gas, preferably air, is carefully supplied in order to achieve substantially stoichiometric combustion even when the hydrocarbon gas composition is not constant. Stoichiometric combustion is maintained by analyzing, preferably continuously analyzing, the hydrocarbon gas composition and adjusting the amount of oxygen-containing gas in response changes in hydrocarbon gas composition in order to maintain substantially stoichiometric combustion.

In practice, this can be accomplished in a variety of ways.

For example, if the hydrocarbon gas is a complex mixture of paraffinic and olefinic gas, the hydrocarbon gas can be analyzed employing conventional gas chromatograph techniques, the amount of oxygen necessary for stoichiometric combustion can be determined, and the speed of a blower supplying air to a combustion zone can be adjusted, or more preferably a control valve in an air supply line can be adjusted, to supply the amount of air necessary for stoichiometric combustion.

More preferably, a hydrocarbon gas will be employed which is comprised of paraffinic hydrocarbons or olefinic hydrocarbons. When the hydrocarbon gas employed is either paraffinic or olefinic hydrocarbons, the specific gravity of the hydrocarbon gas (which is related to its composition) can be related to the amount of oxygen necessary for stoichiometric combustion.

Referring now to FIG. 1, it can be seen that the ratio of air to paraffinic hydrogen gas necessary for stoichiometric combustion is a linear function of the specific gravity of the hydrocarbon gas.

In a preferred embodiment, the specific gravity of the paraffinic or olefinic hydrocarbon gas is continuously measured and the amount of oxygen-containing gas supplied for in-line burning is adjusted in response to changes in hydrocarbon gas specific gravity to maintain substantially stoichiometric combustion.

A variety of methods and apparatuses are known for measuring the specific gravity of hydrocarbon gases. For example, U.S. Pat. No. 3,855,845 to Homolka issued Dec. 24, 1974 discloses a suitable apparatus involving pressure transducers and an electrical output.

A preferred method for use in this invention is known as the "telezometer" method. (See, Kirk-Othmer, Encyclopedia of Chemical Technology, Vol. 7, p. 78, copyright 1951). In this method, a measurement is made of the difference of the torques conveyed to two free rotors by streams of the test gas and a reference gas (usually air), respectively. The gas streams are driven by matched impellers, turned at the same speed in reservoirs of the two gases which are maintained at equal temperature and pressure.

A commercially available device for continuously measuring the specific gravity of gases in this manner is a specific gravity analyzer known as "Ranarex Gas Gravitometer" sold by the Permutit Company, division of Sybron Corporation. The output of the specific gravity analyzer can be transmitted, for example, pneumatically or electronically, to a suitable ratio controller which can control, for example, a control valve in an air supply line to automatically govern the combustion air flow rate to an in-line heater to maintain stoichiometric combustion.

After being heated to hydrogenation temperature, the combined gas stream flows to a catalytic reactor where sulfur dioxide and other sulfur compounds are essentially completely hydrogenated to hydrogen sulfide.

Useful catalysts are those containing metals of Groups Va, VIa, VIII and the rare earth series of the Periodic Table defined by Mendeleeff and published as the "Periodic Chart of the Atoms" by W. N. Welch Manufacturing Company and incorporated herein by reference. The catalysts may be supported or unsupported, although catalysts supported on a silica, alumina or silica alumina base are preferred. The preferred catalysts are those containing one or more of the metals, cobalt, molybdenum, iron, chromium, vanadium, thoria, nickel, tungsten and uranium.

In the catalytic hydrogenation effective conversion can be realized at a space velocity of about 700 to about 3000, preferably from about 1000 to about 2000, cubic feet (calculated at standard conditions) per hour per cubic feet of catalyst.

Hot reactor effluent gases are cooled, preferably in two steps: first, in a stream generator to produce steam, and secondly, in a quench tower using water.

The cooled hydrogenated tail gas, which contains the balance of the hydrogen sulfide formed in the hydrogenation reaction, is then passed through an extraction zone for recovery of hydrogen sulfide. Any number of extraction methods known to those skilled in the art are feasible for this step with absorption methods being preferred. For instance, the cooled hydrogenated tail gas may be passed through alkaline absorption solutions which are continuously regenerated by oxidation to produce elemental sulfur using catalysts such as sodium vanadate, sodium anthraquinone disulfonate, sodium arsenate, sodium ferrocyanide, iron oxide, iodine and like catalysts.

A convenient alternative is to use absorption solutions containing amines, sulfonates, potassium carbonates which can preferentially absorb hydrogen sulfide and be continuously regenerated by steam stripping to produce hydrogen sulfide which can be returned to the Claus reactor.

The following example more specifically illustrates a preferred embodiment of the invention.

EXAMPLE

A Claus sulfur plant tail gas having the following composition of sulfur compounds in moles per hour was treated:

| CONSTITUENT | Moles/Hour |
| --- | --- |
| $H_2S$ | 13.86 |
| $SO_2$ | 6.93 |
| $S_6$ | 0.05 |
| $S_8$ | 0.10 |
| COS | 0.40 |

Figure 2:
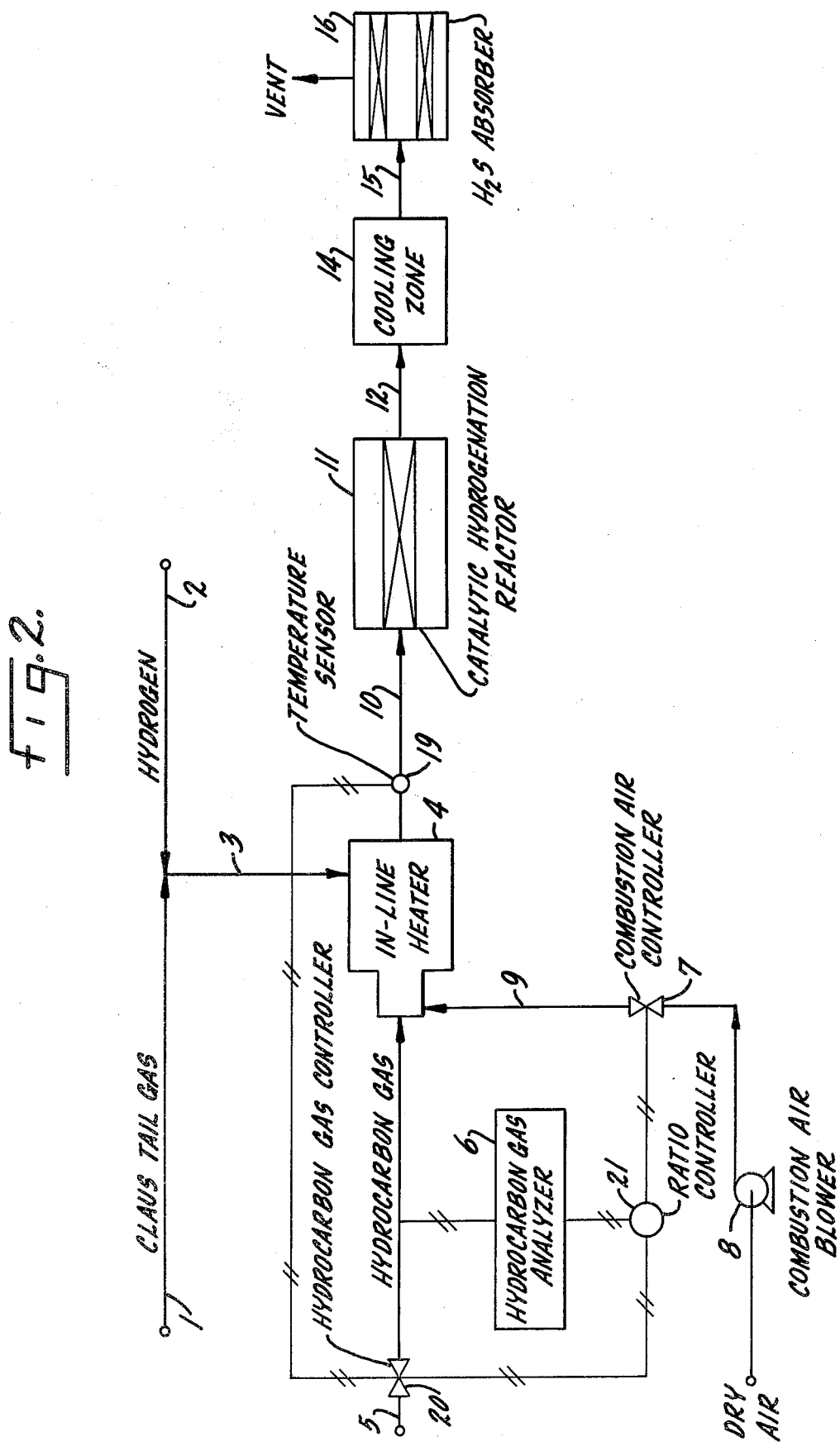
FIG. 2 is a schematic representation of the process of the invention.

Referring now to FIG. 2, this tail gas is introduced via line 1 to a stream of hydrogen from line 2, the amount of hydrogen being sufficient to convert all of the sulfur constituents to hydrogen sulfide. This combined tail gas stream is sent via line 3 to an in-line heater 4. A paraffinic hydrocarbon gas is introduced to the in-line heater 4 via line 5. Hydrocarbon gas controller 20, a control valve responsive to temperature sensor 19, governs the amount of hydrocarbon gas delivered. The hydrocarbon gas controller 20 is equipped to generate a signal corresponding to the amount of hydrocarbon gas supplied to in-line heater 4. The specific gravity of the hydrocarbon gas passing through line 5 is continuously analyzed by a specific gravity analyzer 6, for example, a Ranarex Gas Gravitometer equipped to generate an electronic signal corresponding to the specific gravity of the gas. This signal biases the signal from the hydrocarbon gas controller and the resulting signal is sent to a conventional ratio controller 21 which sets combustion air controller 7, a control valve, governing the air flow from a combustion blower 8 such that the ratio of air to hydrocarbon gas corresponds to a ratio as shown in FIG. 1 for stoichiometric combustion. The air is conveyed by line 9 to in-line heater 4 where it is introduced to the hydrocarbon gas under combustion conditions. Stoichiometric combustion occurs, eliminating the hydrocarbon gas and oxygen, and producing hot gaseous combustion products. These hot gaseous combustion products mix with the combined tail gas stream from line 3 raising the temperature to about 700° F. This hot gaseous stream passes through line 10 to catalytic reactor 11 where substantially all of the sulfur is hydrogenated to hydrogen sulfide. This hydrogenated gas stream passes via line 12 to a cooling zone 14 which comprises several stages. The cooled gas passes from the cooling zone 14 via line 15 to a hydrogen sulfide absorber 16 where hydrogen sulfide is selectively absorbed. The non-absorbed gases, substantially free of hydrogen sulfide, are vented to the atmosphere. Even when the hydrocarbon gas composition fluctuates, the ratio of hydrocarbon gas to air is always such that stoichioometric combustion occurs. The result is that the process is substantially improved in that good results are continuously obtained; i.e., the hydrogenation catalyst is not adversely deactivated by carbon deposits, and undesirable sulfur reaction products (non-hydrogen sulfide) are minimized.

What is claimed is:

1. In a process for reducing the sulfur content of a Claus tail gas stream involving (1) combining the tail gas stream with a hydrogen source in an amount at least equal to the stoichiometric amount required to convert the sulfur content to hydrogen sulfide, (2) raising the temperature of the combined stream to hydrogenation temperature by combusting an amount of hydrocarbon gas and oxygen-containing gas to provide hot gaseous combustion products and mixing the hot combustion products with the combined stream, (3) introducing the heated mixture to a catalytic reaction zone to convert substantially all of the sulfur content to hydrogen sulfide, and (4) treating the hydrogenated gas stream to remove hydrogen sulfide; the improvement comprising adjusting the amount of oxygen-containing gas in response to changes in hydrocarbon gas specific gravity to maintain substantially stoichiometric combustion.

2. The process of claim 1 wherein the hydrocarbon gas is comprised of paraffinic hydrocarbon gases.

3. The process of claim 1 wherein the hydrocarbon gas is comprised of olefinic hydrocarbon gases.

4. The process of claim 1 wherein the oxygen-containing gas is air.

5. The process of claim 2 wherein the oxygen-containing gas is air.

6. The process of claim 3 wherein the oxygen-containing gas is air.

7. The process of claim 1 wherein the hydrogenation temperature is from 300° F. to 800° F.

8. The process of claim 2 wherein the hydrogenation temperature is from 300° F. to 800° F.

9. The process of claim 3 wherein the hydrogenation temperature is from 300° F. to 800° F.

10. The process of claim 2 wherein the hydrocarbon gas is a non-constant mixture of two or more paraffinic hydrocarbons selected from the group consisting of methane, ethane, propane, butane and pentane.

11. The process of claim 3 wherein the hydrocarbon gas is a non-constant mixture of two or more olefinic hydrocarbons selected from the group consisting of ethylene, propylene, butenes and pentenes.

* * * * *